(12) United States Patent
Anderson et al.

(10) Patent No.: US 11,378,512 B2
(45) Date of Patent: Jul. 5, 2022

(54) CORROSION PROCESS SIMULATOR

(71) Applicant: Halliburton Energy Services, Inc., Houston, TX (US)

(72) Inventors: George Robert Anderson, Houston, TX (US); Russell Cody Strong, Jr., Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 55 days.

(21) Appl. No.: 16/559,255

(22) Filed: Sep. 3, 2019

(65) Prior Publication Data

US 2021/0063301 A1 Mar. 4, 2021

(51) Int. Cl.
*G01N 17/04* (2006.01)
(52) U.S. Cl.
CPC .................................. *G01N 17/043* (2013.01)
(58) Field of Classification Search
CPC ..... G01N 17/043; G01N 17/046; G01N 17/04
USPC ........... 73/86, 865.8, 865.9, 866, 7; 324/700
See application file for complete search history.

(56) References Cited

U.S. PATENT DOCUMENTS

| | | | | |
|---|---|---|---|---|
| 2,956,225 A | * | 10/1960 | Marsh | G01N 17/00 324/71.1 |
| 3,427,873 A | * | 2/1969 | Mehdizadeh | G01N 3/32 73/809 |
| 4,019,133 A | * | 4/1977 | Manley | G01N 17/00 324/700 |
| 4,945,758 A | * | 8/1990 | Carpenter | E21B 41/02 73/86 |
| 5,260,218 A | | 11/1993 | Garde | |
| 5,365,779 A | | 11/1994 | Vander Velde | |
| 6,077,418 A | | 6/2000 | Iseri et al. | |
| 6,405,582 B1 | * | 6/2002 | Boettcher | G01N 5/02 73/61.62 |
| 2006/0037399 A1 | * | 2/2006 | Brown | G01N 17/008 73/580 |
| 2009/0085585 A1 | * | 4/2009 | Lu | G01N 17/04 324/700 |
| 2012/0031629 A1 | * | 2/2012 | Kochelek | G01N 17/043 169/5 |
| 2021/0060370 A1 | * | 3/2021 | Goyette | A62C 37/36 |

FOREIGN PATENT DOCUMENTS

| | | |
|---|---|---|
| KR | 10-2008-0103124 | 11/2008 |
| KR | 10-1440554 | 9/2014 |

OTHER PUBLICATIONS

International Search Report and Written Opinion for Application No. PCT/US2019/049387, dated Jun. 2, 2020.

* cited by examiner

*Primary Examiner* — Robert R Raevis
(74) *Attorney, Agent, or Firm* — Tenley Krueger; C. Tumey Law Group PLLC

(57) ABSTRACT

An apparatus may include: a body defining a flow path; an inlet to the flow path; an outlet to the flow path; a test coupon at least partially disposed within the flow path; a sealing element disposed between the test coupon and the body; and a current source electrically coupled to the test coupon, wherein the inlet and the outlet are in fluid communication through the flow path, and wherein the sealing element electrically insulates the body and the test coupon.

17 Claims, 2 Drawing Sheets

CORROSION PROCESS SIMULATOR

BACKGROUND

Corrosion testing has been developed across many industries to monitor and predict performance of materials when exposed to corrosive environment. While there may be many types of corrosion testing apparatuses and associated methods, each technique may have certain advantages and drawbacks. One method of corrosion testing may include an autoclave method. In the autoclave method, a test coupon may be at least partially submerged in a corrosive liquid within an autoclave or other heating device. The test coupon may be agitated in the corrosive liquid by spinning or otherwise moving the test coupon and liquid relative to each other to accelerate the corrosion process. After a specified time has passed, the test coupon may then be removed and weighed to assess the material loss due to corrosion. While the autoclave method may be effective in determining corrosion effects, the test apparatus may generate secondary effects that may not be reflective of real world conditions under which corrosion may occur. For example, spinning or agitating the test coupon in the fluid may result in fluid flow profiles that are not seen in pipe flow including potential turbulent flow on trailing edges of the test coupon and eddy currents in the bulk fluid. Furthermore, the heating method in an autoclave device is typically not representative of heating methods encountered in actual application. Some heating methods may include heating an outside surface of a conduit while flowing a fluid through the conduit such as in a heat exchanger application. The temperature profile in an autoclave method may be generally uniform across the test coupon due to the coupon being submerged in heated liquid. As such, autoclave methods may not capture the effects of non-uniform temperature profiles often seen in pipe flow applications.

BRIEF DESCRIPTION OF THE DRAWINGS

These drawings illustrate certain aspects of some of the present disclosure and should not be used to limit or define the disclosure.

DETAILED DESCRIPTION

The present disclosure is directed to corrosion monitoring and, more particularly, to apparatus, systems, and methods for testing corrosivity of fluids. As mentioned above, corrosion testing has been developed across many industries to monitor and predict performance of materials when exposed to corrosive environment. In refinery, chemical handling, chemical processing, applications, there may be particular interest in the corrosion of metals caused by of liquids and gasses as most process equipment is constructed from metal components and a majority of product handled is in liquid and gas states. There may be many types of fluids that may be tested for corrosive properties including, without limitation, acid gasses, corrosive hydrocarbons, or corrosive ionic liquids, for example. Some specific corrosive fluids may include hydrocarbon oils containing naphthenic acid. The term corrosive fluid as used herein should be understood to be the fluid being tested for corrosive properties and does not necessarily indicate that the fluid is corrosive to a test coupon. The methods systems and apparatus discussed herein may allow the corrosive properties of fluids on test coupons to be observed and quantified.

Figure 1:
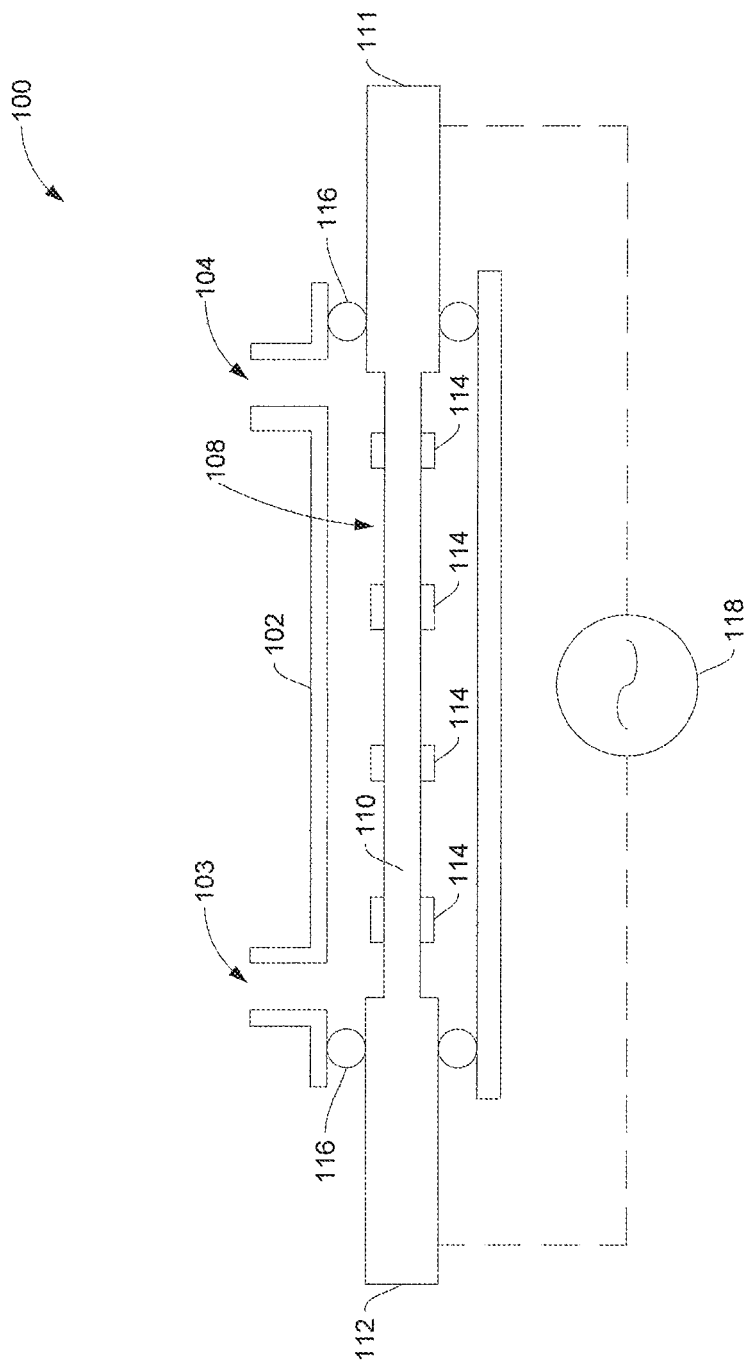
FIG. 1 is a cross sectional illustration of example corrosion monitoring apparatus.

A corrosion monitoring apparatus, system, and method are described herein. FIG. 1 is a cross sectional illustration of a corrosion monitoring apparatus 100. Corrosion monitoring apparatus 100 may include body 102. As illustrated, body 102 has an interior that defines a flow path 108. Interior of body 102 may be any cross-sectional shape that defines flow path 108 such as circular, triangular, hexagonal, or any other shape which can define a flow path. In some examples, body 102 may include conduit geometries such as a pipe, a duct, a channel, a trough, a tube, or line, for example. An inlet 103 and outlet 104 may be disposed on body 102 with flow path 108 providing a means for fluid communication between inlet 103 and outlet 104. Inlet 103 and outlet 104 may be disposed on body 102 in any manner. As shown in FIG. 1, inlet 103 and outlet 104 are shown disposed on a surface of body 102 providing fluid communication from inlet 103 to outlet 104 via a hollow interior of each of inlet 103 and outlet 104. However, inlet 103 and/or outlet 104 may be otherwise disposed. For example, inlet 103 and/or outlet 104 may be disposed within body 102 such that inlet 103 and/or outlet 104 may be a perforation through body 102. Inlet 103 and outlet 104 may include connections for coupling inlet 103 and outlet 104 to an external fluid source. Said connections may be of any type such as interference fittings, screw fittings, shrink fittings, welded fittings, or any other suitable connection for connecting inlet 103 and/or outlet 104 to external fluid sources.

Body 102 may be constructed from any suitable material such as, without limitation, metal, ceramic, plastic, polymer, or a combination thereof. The material of construction for body 102 may be selected based on several factors including compatibility with test fluids and material stability at elevated temperature, for example. Some specific materials that may be used for the body include metals such as stainless steel, aluminum alloys, Inconel alloys, porcelain, and polytetrafluoroethylene, for example As illustrated, a test coupon 110 may be disposed within body 102 and may be positioned in flow path 108 such that fluids in flow path 108 may contact test coupon 110. Test coupon 110 may include a first end 111 and a second 112. In the illustrated embodiment, the first end 111 and the second end 112 may be enlarged. The first end 111 and the second end may protrude from the body 102, as shown on FIG. 1. Test coupon 110 may also include at least one protrusion 114 that extend from a surface of test coupon 110. Protrusion 114 may include any suitable geometry such as, without limitation, fins, spirals, blocks, or toroidal, for example. Test coupon 110 may be constructed from a material of interest which is desired to be tested for corrosion. There may be interest in testing the corrosion susceptibility of a particular part of a machine or type of conduit such as a pipe, for example. As such, the test coupon 110 may be constructed from any electrically conductive material of interest desired to be tested. In some examples, test coupon 110 may constructed from a metal or metal alloy which the metallurgy matches or closely mimics the metallurgy of the part or conduit of interest. Some exemplary materials may include carbon steels and Inconel alloys, for example. Although only a few materials of construction have been mentioned, in principle, test coupon 110 may be constructed from any electrically conductive material of interest for which corrosion testing may be desired One or more sealing element 116 may be disposed about test coupon 110 between body 102 to provide a seal between an interior of body 102 and an exterior of body 102. As illustrated, two of the sealing elements 116 may be provided with one of the sealing elements 116 at the first end 111 of the test coupon 110 and the other of the sealing elements 116 at the second end 112 of the test coupon 110. Sealing element 116 may prevent or reduce fluid leaking from an interface between test coupon 110 and body 102. Sealing element 116 may also provide electrical insulation between body 102 and test coupon 110 such that electrical current does not readily pass from test coupon 110 to body 102. Sealing element 116 may be constructed from any material that provides fluid sealing and electrical isolation including, without limitation, polymers and ceramics, for example. In a specific example, sealing element 116 may be a rubber material and more specifically, a rubber O-ring.

Corrosion monitoring apparatus 100 may further include current source 118 which may be electrically connected to the test coupon 110. As illustrated, the current source 118 may be electrically connected to the first end 111 and the second end 112 of the test coupon 110. Current source 118 may provide current to first end 111 and/or second end 112 which may pass through test coupon 110. Current provided by current source 118 may cause a temperature rise within test coupon 110 through resistive heating. Current source 118 may provide any kind of current such as AC and/or DC current, the magnitude of which may be voltage controlled and/or current controlled such that temperature rise in test coupon 110 may be controlled. Current source 118 may include control circuitry capable of accepting an input signal and adjusting current in response to the control signal.

As mentioned above there may be many different types of corrosive fluids that may be tested as well as a numerous selection of materials that may be desired to be tested for corrosion. Some fluids may include liquids such as, without limitation, oleaginous fluids, ionic fluids, oils, hydrocarbons, ketones, aldehydes, and esters, for example or gasses such as, without limitation, hydrogen sulfide, carbon dioxide, ammonia, and gaseous hydrocarbons, for example. In some examples, a test coupon may be formed from a material of interest and be used in corrosion monitoring apparatus 100 "as is" without further processing. Alternatively, the test coupon may be subjected to additional processing before being used in corrosion monitoring apparatus 100. For example, the test coupon may be surface treated by passivation by exposure to sulfides, phosphates, or other passivating compounds. Other surface treatments may include removal of oxide layers, for example.

A method of using corrosion monitoring apparatus 100 may include selecting a material to be tested for corrosion and obtaining or providing a test coupon 110 that includes the selected material. The test coupon 110 may be treated using one or more surface treatment methods described above after which the test coupon 110 may be cleaned using an appropriate solvent, dried, weighed, and placed in corrosion monitoring apparatus 100. A fluid may be selected to corrode the test coupon such as a corrosive liquid. The corrosive liquid may be supplied to corrosion monitoring apparatus 100 via a pump (not shown) for example, which may pump the corrosive liquid through inlet 103 through flow path 108 and out outlet 104. The corrosive fluid may contact test coupon 110 as the corrosive fluid flows through flow path 108 which may corrode the test coupon 110 through removal of mass from test coupon 110. After a period of time, the corrosive fluid flow may be stopped and test coupon 110 may be removed from corrosion monitoring apparatus 100, washed, dried, and weighed to observe the mass lost during the corrosion test.

In some examples, the corrosion process may be relatively slow at lower temperatures compared to at elevated temperatures. As discussed above, current from current source 118 may flow through test coupon 110 causing a temperature rise within test coupon 110 which may heat the corrosive fluid contacting test coupon 110. The increased temperature may accelerate corrosion effects of the corrosive fluid such that the corrosion may be studied in a shorter time period. The method discussed above may further include increasing the temperature of the corrosive fluid by heating test coupon 110 using current source 118 while the corrosive fluid is flowing through corrosion monitoring apparatus 100.

In examples where the test coupon 110 is heated, the temperature of the corrosive fluid may be measured at the inlet 103, outlet 104, or both. For example, a thermocouple, thermometer, or other device capable of measuring temperature of the corrosive fluid may be disposed at or near inlet 103, outlet 104, or both. A skin temperature of the test coupon 110 may be estimated from models of convective heat transfer correlations using the measured temperatures at the inlet and outlet or measured directly by thermocouple or other temperature sensing device, as will be apparent to those of ordinary skill in the art. In some examples, a thermocouple may be disposed within the test coupon such as in a bored hole in the central axis of the test coupon. Skin temperature may be manipulated by varying current provided to test coupon 110 by current source 118 such that the temperature rise of the corrosive fluid may be controlled. For example, providing relatively higher current to test coupon 110 may raise the temperature of the corrosive fluid flowing through corrosion monitoring apparatus 100 more than providing a relatively lower current. Temperature may affect rates of corrosion so by manipulating current flow, and therefore the temperature of the corrosive fluid contacting test coupon 110, the rates of corrosion can be readily monitored by adjusting current provided by current source 118. Furthermore, monitoring current draw may indicate the degree of corrosion that has occurred. In general, a material with a relatively larger cross sectional area will have a smaller resistance than the same material with a relatively smaller cross sectional area. Corrosion may decrease the cross sectional area of test coupon 110 which may cause an increase in measured resistance. The measured resistance may then be correlated to corrosion. Furthermore, monitoring of a combined variable of all or some measured parameters may indicate the degree of corrosion that has occurred. In examples where the skin temperature is measured or estimated, the change heat transfer coefficient may also be calculated or estimated from a change in one or more measured parameters. A change in heat transfer coefficient may indicate whether corrosion has occurred and the degree thereof. Some variables that may affect heat transfer coefficient may include, but are not limited to, surface area, geometry, and the chemical composition of the surface which may change with corrosion.

Figure 2:
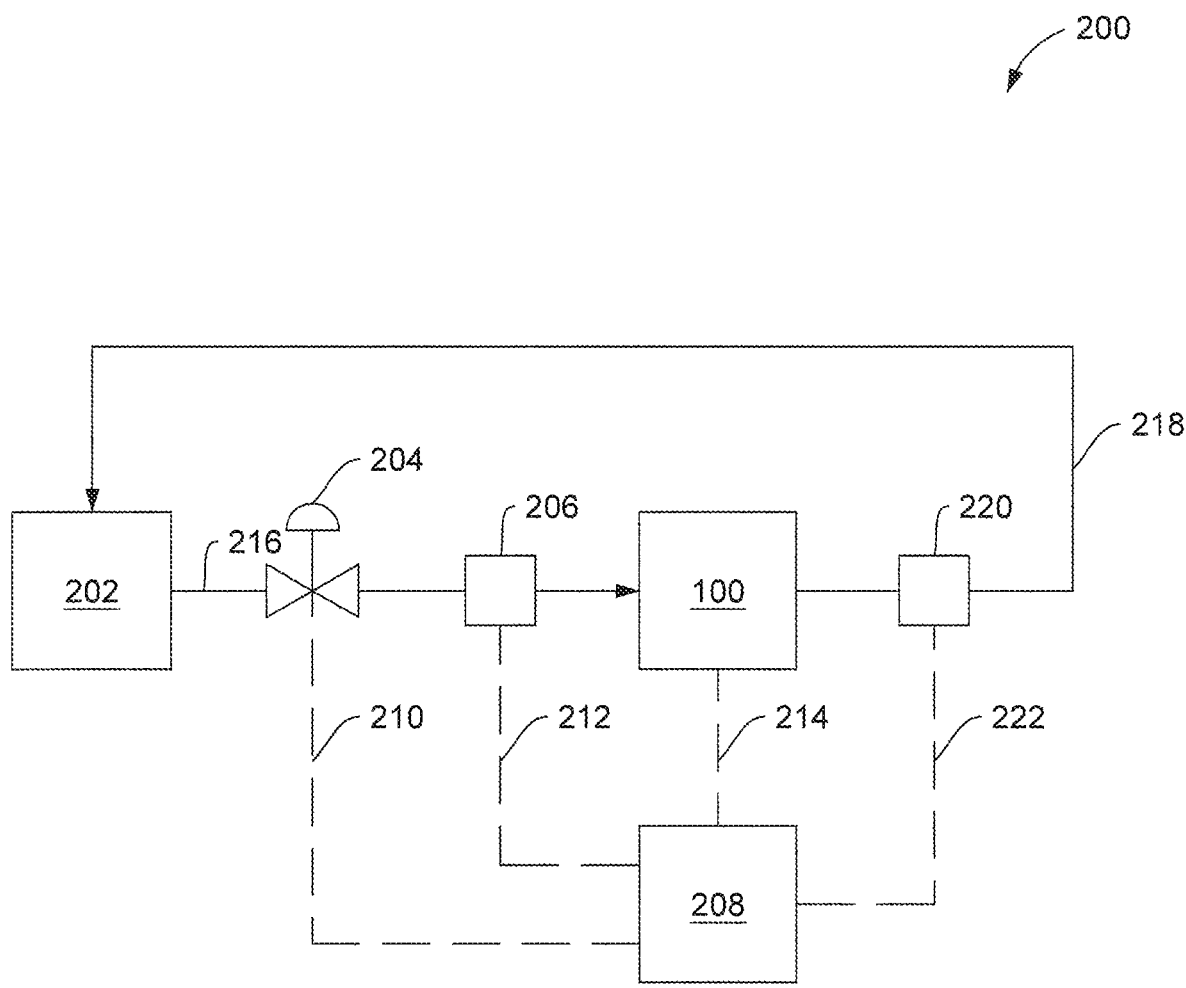
FIG. 2 is a system including a corrosion monitoring apparatus.

FIG. 2 illustrates a system 200 including corrosion monitoring apparatus 100 from FIG. 1. As illustrated in FIG. 2, corrosion monitoring apparatus 100 may be part of a larger system that provides control, monitoring, and fluid to corrosion monitoring apparatus 100. Fluid source 202 may include a container suitable to store a corrosive fluid and a pump operable to move corrosive fluid from the container to corrosion monitoring apparatus 100. Fluid source 202 may be fluidically coupled to the inlet 103 (e.g., shown on FIG. 1) of corrosion monitoring apparatus 100 by inlet line 216.

Valve 204 may regulate pressure and flow rate of the fluid flowing through inlet line 216.

Any combination of pressure, temperature, and flow rate of the fluid flowing through inlet line 216 may be measured by flow monitor 206. Flow monitor 206 may include any suitable pressure, temperature, and flow rate monitors including, but not limited to, pressure transducers, thermocouples, and ultrasonic flow meters for example. Fluid may flow through corrosion monitoring apparatus 100 and exit via return line 218 which may be coupled to outlet 104 (e.g., shown on FIG. 1). Pressure and temperature of the fluid flowing through return line 218 may be measured by pressure-temperature monitor 220. Pressure-temperature monitor 220 may include any suitable pressure and temperature monitors including, but not limited to, pressure transducers and thermocouples, for example. FIG. 2 illustrates an embodiment where return line 218 returns fluid from corrosion monitoring apparatus 100 to fluid source 202. In the illustrated embodiment, fluid is recycled and reused. However, there may be embodiments where the fluid is not recycled such as in a one pass method. In such an embodiment, the fluid is not returned to fluid source 202 but would be sent to a waste collection container (not illustrated).

FIG. 2 further illustrates control system 208 which may monitor and adjust process conditions within system 200. Control system 208 may include a computer system, programmable logic controller, or any other control system capable of monitoring and adjusting process variables within system 200. As shown in FIG. 2, control system 208 and valve 204 may be connected via valve signal 210. Valve signal 210 may be a control signal to indicate to valve 204 how far to open to provide a flow rate at a set point and a pressure at a set point in inlet line 216. Valve signal 210 may also provide the current position of the valve to control system 208. Control system 208 and flow monitor 206 may be connected via an inlet signal 212. Flow monitor 206 may provide information regarding any combination of temperature, pressure, and flow rate to control system 208 via inlet signal 212. Control system 208 may compare flow rate and pressure reported by flow monitor 206 to a setpoint value for flow rate and pressure and send a control signal to valve 204 via valve signal 210 to make adjustments to the operation of valve 204 such that the pressure and flow rate remain within an operational envelope. Control system 208 may further be connected to corrosion monitoring apparatus 100 via source signal 214 which may provide control and monitoring of current from current source 118 illustrated in FIG. 1. Control system 208 may provide a control signal to current source 118 to adjust the current flowing through test coupon 110 in FIG. 1, for example. As discussed above, the skin temperature of test coupon 110 and corresponding temperature rise of fluids in corrosion monitoring apparatus 100 may be controlled by adjusting the current flowing through test coupon 110. Pressure-temperature monitor 220 may be connected to control system 208 via outlet signal 222 such that pressure and/or temperature of fluids exiting corrosion monitoring apparatus 100 may be monitored and provided to control system 208. Control system 208 may compare the temperature of the fluid exiting corrosion monitoring apparatus 100 to a set point value and send a control signal to corrosion monitoring apparatus 100 by current signal 214 to adjust the current provided to test coupon 110.

Accordingly, the present disclosure may provide methods, systems, and apparatus that may relate to corrosion process simulation. The methods, systems, and apparatus may include any of the various features disclosed herein, including one or more of the following statements.

Statement 1. An apparatus comprising: a body defining a flow path; an inlet to the flow path; an outlet to the flow path; a test coupon at least partially disposed within the flow path; a sealing element disposed between the test coupon and the body; and a current source electrically coupled to the test coupon, wherein the inlet and the outlet are in fluid communication through the flow path, and wherein the sealing element electrically insulates the body and the test coupon.

Statement 2. The apparatus of statement 1 wherein the inlet and the outlet further comprise connections operable to couple the inlet and the outlet to an external fluid source.

Statement 3. The apparatus of any of statements 1-2 wherein the test coupon comprises an electrically conductive material.

Statement 4. The apparatus of any of statements 1-3 wherein the test coupon comprises a passivated layer disposed on a surface of the test coupon.

Statement 5. The apparatus of any of statements 1-4 further comprising a temperature measurement device disposed at the inlet, the outlet, or both the inlet and the outlet.

Statement 6. The apparatus of any of statements 1-5 further comprising a pressure measurement device disposed at the inlet, the outlet, or both the inlet and the outlet.

Statement 7. A method of corrosion monitoring comprising: weighing a test coupon to determine a first weight; inserting the test coupon into a flow path defined by a body, wherein one or more sealing elements are disposed between the test coupon and the body; flowing a fluid from an inlet of the body, through the flow path, and to an outlet of the body such that the fluid contacts the test coupon; flowing current through the test coupon while flowing the fluid to heat the test coupon; and thereafter, weighing the test coupon to determine a second weight.

Statement 8. The method of statement 7 wherein the test coupon comprises an electrically conductive material.

Statement 9. The method of any of statements 7-8 wherein the test coupon comprises a passivated layer disposed on a surface of the test coupon.

Statement 10. The method of any of statements 7-9 further comprising measuring a first temperature of the fluid before the fluid enters the inlet and measuring a second temperature of the fluid after the fluid exits the outlet.

Statement 11. The method of any of statements 7-10 further comprising adjusting the current flowing through the test coupon based at least in part on the first temperature and/or the second temperature.

Statement 12. The method of statement 11 wherein the step of adjusting the current comprises estimating a skin temperature of the test coupon using convective heat transfer correlations and adjusting the current based at least in part on the skin temperature.

Statement 13. The method of any of statements 7-12 wherein the step of flowing a fluid comprises recycling the fluid from the outlet to the inlet.

Statement 14. The method of any of statements 7-13 determining corrosion based at least in part on a difference between the first weight and the second weight.

Statement 15. A system comprising: a corrosion monitoring apparatus comprising: a body defining a flow path; an inlet to the flow path; an outlet to the flow path; a test coupon at least partially disposed within the flow path; a sealing element disposed between the test coupon and the body; and a current source electrically coupled to the test coupon, wherein the inlet and the outlet are in fluid communication through the flow path, wherein the sealing element electrically insulates the body and the test coupon, wherein the current source supplies current to the test coupon, and wherein the current source comprises control circuitry capable of varying current supplied to the test coupon; and a control system configured to provide a control signal to the current source.

Statement 16. The system of statement 15 further comprising a fluid source fluidically coupled to the inlet.

Statement 17. The system of statement 16 further comprising a valve disposed between the fluid source and the inlet, wherein the valve is fluidically coupled to the fluid source and the inlet.

Statement 18. The system of statement 17 further comprising a flow monitor operable to measure any combination of pressure, temperature, or flow rate of a fluid between the valve and the inlet.

Statement 19. The system of any of statements 15-18 further comprising a monitor operable to measure any combination of pressure or temperature of a fluid exiting the outlet.

Statement 20. The system of any of statements 15-19 further comprising a fluid source fluidically coupled to the inlet, a flow monitor operable to measure any combination of pressure, temperature, or flow rate of a fluid between the valve and the inlet, and a monitor operable to measure any combination of pressure or temperature of a fluid exiting the outlet.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. An apparatus comprising:
    a body defining a flow path;
    an inlet to the flow path;
    an outlet to the flow path;
    a first thermocouple for measuring a first temperature of a fluid in the inlet to the flow path;
    a second thermocouple for measuring a second temperature of the fluid in the outlet to the flow path;
    a test coupon at least partially disposed within the flow path;
    a sealing element disposed between the test coupon and the body;
    a current source electrically coupled to the test coupon, wherein the current source is configured to flow current through the test coupon; and
    a programmable logic controller for adjusting the current flowing through the test coupon based at least in part on the first temperature and/or the second temperature;
    wherein the inlet and the outlet are in fluid communication through the flow path, and wherein the sealing element electrically insulates the body and the test coupon.

2. The apparatus of claim 1 wherein the inlet and the outlet further comprise connections operable to couple the inlet and the outlet to an external fluid source.

3. The apparatus of claim 1 wherein the test coupon comprises an electrically conductive material.

4. The apparatus of claim 1 wherein the test coupon comprises a passivated layer disposed on a surface of the test coupon.

5. The apparatus of claim 1 further comprising a pressure measurement device disposed at the inlet, the outlet, or both the inlet and the outlet.

6. A method of corrosion monitoring comprising:
    weighing a test coupon to determine a first weight;
    inserting the test coupon into a flow path defined by a body, wherein one or more sealing elements are disposed between the test coupon and the body;
    flowing a fluid from an inlet of the body, through the flow path, and to an outlet of the body such that the fluid contacts the test coupon;
    flowing current through the test coupon while flowing the fluid to heat the test coupon;
    measuring a first temperature of the fluid before the fluid enters the inlet and measuring a second temperature of the fluid after the fluid exits the outlet;
    adjusting the current flowing through the test coupon based at least in part on the first temperature and/or the second temperature; and
    thereafter, weighing the test coupon to determine a second weight.

7. The method of claim 6 wherein the test coupon comprises an electrically conductive material.

8. The method of claim 6 wherein the test coupon comprises a passivated layer disposed on a surface of the test coupon.

9. The method of claim 6 wherein the step of adjusting the current comprises estimating a skin temperature of the test coupon using convective heat transfer correlations and adjusting the current based at least in part on the skin temperature.

10. The method of claim 6 wherein the step of flowing a fluid comprises recycling the fluid from the outlet to the inlet.

11. The method of claim 6 determining corrosion based at least in part on a difference between the first weight and the second weight.

12. A system comprising:
    a corrosion monitoring apparatus comprising:

a body defining a flow path;
an inlet to the flow path;
an outlet to the flow path;
a first thermocouple for measuring a first temperature of a fluid in the inlet to the flow path;
a second thermocouple for measuring a second temperature of the fluid in the outlet to the flow path;
a test coupon at least partially disposed within the flow path;
a sealing element disposed between the test coupon and the body; and
a current source electrically coupled to the test coupon, wherein the inlet and the outlet are in fluid communication through the flow path, wherein the sealing element electrically insulates the body and the test coupon, wherein the current source supplies current to the test coupon, and wherein the current source comprises control circuitry capable of varying current supplied to the test coupon; and
a control system comprising a programmable logic controller configured to provide a control signal to the current source, wherein the control system is configured to adjust the current flowing through the test coupon based at least in part on the first temperature and/or the second temperature.

13. The system of claim 12 further comprising a fluid source fluidically coupled to the inlet.

14. The system of claim 13 further comprising a valve disposed between the fluid source and the inlet, wherein the valve is fluidically coupled to the fluid source and the inlet.

15. The system of claim 14 further comprising a flow monitor operable to measure any combination of pressure or flow rate of a fluid between the valve and the inlet.

16. The system of claim 12 further comprising a monitor operable to measure pressure of a fluid exiting the outlet.

17. The system of claim 12 further comprising a fluid source fluidically coupled to the inlet, a flow monitor operable to measure any combination of pressure or flow rate of a fluid between a valve and the inlet, and a monitor operable to measure pressure, of a fluid exiting the outlet.

* * * * *